US009624791B2

(12) United States Patent
Weir (10) Patent No.: US 9,624,791 B2
(45) Date of Patent: Apr. 18, 2017

(54) NOISE SUPPRESSION APPARATUS AND METHODS OF MANUFACTURING THE SAME (71) Applicant: HONEYWELL INTERNATIONAL INC., Morristown, NJ (US)

(72) Inventor: Don Weir, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 323 days.

(21) Appl. No.: 14/483,730

(22) Filed: Sep. 11, 2014

(65) Prior Publication Data

US 2016/0076400 A1  Mar. 17, 2016

(51) Int. Cl.
*F01D 9/04* (2006.01)
*F01D 25/24* (2006.01)
*F01D 25/28* (2006.01)
*F02K 1/82* (2006.01)
*F02C 7/045* (2006.01)
(Continued)

(52) U.S. Cl.
CPC .......... *F01D 25/28* (2013.01); *B29C 67/0055* (2013.01); *B64D 33/06* (2013.01); *E04B 1/84* (2013.01); *F01D 9/04* (2013.01); *F01D 25/24* (2013.01); *F02C 7/045* (2013.01); *F02K 1/827* (2013.01); *F04D 29/526* (2013.01); *F04D 29/545* (2013.01); *G10K 11/172* (2013.01); *G10K 11/175* (2013.01); *B29L 2009/00* (2013.01); *B33Y 10/00* (2014.12); *B64D 2033/0206* (2013.01); *F05D 2260/96* (2013.01)

(58) Field of Classification Search
CPC ... F01D 9/02; F01D 9/023; F01D 9/04; F01D 25/24; F01D 25/28; E04B 1/84; E04B 2001/8476; E04B 2001/848; E04B 2001/849; E04B 2001/8495; B64D 2033/0206; B64D 33/06; F02K 1/827; F02C 7/045; F05D 2240/11; F05D 2240/14; F04D 29/403; F04D 29/52; F04D 29/522; F04D 29/526; F04D 29/541; F04D 29/545
See application file for complete search history.

(56) References Cited

U.S. PATENT DOCUMENTS 2,161,708 A * 6/1939 Heerwagen ........... E04B 1/8409
181/291
2,995,200 A * 8/1961 Seifert ...................... F01N 1/06
181/213
(Continued)

FOREIGN PATENT DOCUMENTS

GB 1462393 A 1/1977
GB 2452476 A 11/2009

OTHER PUBLICATIONS

Internet print-out of http://www.sciencedirect.com/science/journal/03601323/72 (retrieved Sep. 21, 2016).*
(Continued)

Primary Examiner — Gregory Anderson
Assistant Examiner — Christopher R Legendre
(74) Attorney, Agent, or Firm — Lorenz & Kopf, LLP (57) ABSTRACT

A noise suppression apparatus includes a body portion including a plurality of nested channels, each channel of the plurality of nested channels including a first end opening and a second end opening, and a surface portion including each first end opening and each second end opening of each channel.

3 Claims, 7 Drawing Sheets (51) Int. Cl.

| | | |
|---|---|---|
| *F04D 29/52* | (2006.01) | |
| *F04D 29/54* | (2006.01) | |
| *B64D 33/02* | (2006.01) | |
| *B29C 67/00* | (2006.01) | |
| *E04B 1/84* | (2006.01) | |
| *G10K 11/172* | (2006.01) | |
| *G10K 11/175* | (2006.01) | |
| *F02K 1/34* | (2006.01) | |
| *B33Y 10/00* | (2015.01) | |
| *B29L 9/00* | (2006.01) | |

(56) References Cited

U.S. PATENT DOCUMENTS

| | | | | |
|---|---|---|---|---|
| 3,542,152 A * | 11/1970 | Oxx, Jr. | ............... | B64D 33/02 181/214 |
| 3,957,134 A * | 5/1976 | Daniel | .................. | G10K 11/30 181/176 |
| 4,339,018 A * | 7/1982 | Warnaka | .............. | G10K 11/172 181/224 |
| 6,290,022 B1 * | 9/2001 | Wolf | .................... | G10K 11/172 181/286 |
| 8,602,156 B2 | 12/2013 | Ali et al. | | |
| 2013/0302154 A1 | 11/2013 | Finlayson | | |
| 2016/0076400 A1 * | 3/2016 | Weir | ...................... | F02K 1/827 415/119 |

OTHER PUBLICATIONS

Selamet, A. and Easwaran, V. "Modified Herschel-Quincke tube: Attenuation and resonance for n-duct configuration". J Acoust. Soc. Am. 102 (1), Jul. 1997, pp. 164-169.*

Kashdan, L. et al.; Design, Fabrication and Evaluation of Negative Stiffness Elements Using Selective Laser Sintering; Rapid Prototyping Journal, in Press (Accepted Nov. 19, 2010).

Foteini Setaki, et al.; Acoustic Absorbers by Additive Manufacturing; Building and Environment, 72 (2014) 188-200.

Oliver, G.; Investigating broadband acoustic absorption using rapid manufacturing; 2008, Loughborough University.

EP Extended Search Report for Application No. 15172808.6 Dated Feb. 3, 2016.

Panigrahi, S.N., et al. "Plane wave propagation in generalized multiply connected acoustic filters," Facility for Research in Technical Acoustics, Department of Mechanical Engineering, Indian Institute of Science, Bangalore, India, XP012073401, Oct. 26, 2004.

Zhi-Liang Hong et al. "Numerical Simulation of the Herschelquincke Tube Con-Cept as a Noise Control Device for Turbofan Engines," Jounnal of Engineerjng Thermophysics, pp. 1491-1494, XP055244908, Sep. 9, 2008.

* cited by examiner

NOISE SUPPRESSION APPARATUS AND METHODS OF MANUFACTURING THE SAME

STATEMENT REGARDING FEDERALLY SPONSORED RESEARCH OR DEVELOPMENT

This invention was made with Government support under contract NNC14VC60P awarded by the NASA/Glenn Research Center. The Government has certain rights in the invention.

TECHNICAL FIELD

The inventive subject matter relates to noise suppression apparatus and, more particularly, to noise suppression apparatus and methods of manufacturing the same that may be used in connection with turbine systems.

BACKGROUND

Operating machinery may generate noise-causing vibrations. Modern aircraft may include various turbine systems such as jet engines (i.e., one or more gas-powered turbine engines), auxiliary power units (APUs), and/or environmental control systems (ECSs), which can generate both thrust to propel the aircraft and electrical and pneumatic energy to power systems installed in the aircraft by the flowing of a fluid, such as air, there-through. Although such aircraft systems are generally safe, reliable, and efficient, they can exhibit certain drawbacks. For example, turbine engine systems can be sources of noise, especially during aircraft take-off and landing operations. Additionally, APUs and ECSs can be sources of ramp noise while an aircraft is parked at the airport.

To mitigate the noise emanating from aircraft, various types of noise reduction systems have been developed. For example, noise suppression panels have been incorporated into some aircraft ducts and plenums, or into other channels and conduits that direct the flow of fluid relative to a solid object. Typically, noise suppression panels have flat or contoured outer surfaces, and include either a bulk absorber material or a honeycomb structure disposed between a backing plate and a face plate. The noise suppression panels are placed proximate the noise-generating source, such as on an interior surface of an engine or in an APU inlet and/or outlet ducts, as necessary, to reduce noise emanations.

Although the above-described noise suppression panels exhibit fairly good noise suppression characteristics, they may be improved. In particular, with the advent of additive manufacturing techniques, noise suppression panel configurations may become possible that were heretofore too costly or too complex to practically implement using conventional manufacturing technologies. Hence, there is continuing need for improved noise suppression configurations that take advantage of the latest manufacturing technologies to reduce manufacturing costs and increase noise suppression performance. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

The present disclosure is generally directed to noise suppression apparatus and related technologies, and methods of manufacturing the same. In one exemplary embodiment, a noise suppression apparatus includes a body portion including a plurality of nested channels, each channel of the plurality of nested channels including a first end opening and a second end opening, and a surface portion including each first end opening and each second end opening of each channel.

In another exemplary embodiment, a turbine system includes a rotating component, a wall component annularly surrounding the rotating component, and a noise suppression apparatus disposed within or along the wall component. The noise suppression apparatus includes a body portion including a plurality of nested channels, each channel of the plurality of nested channels including a first end opening and a second end opening, and a surface portion proximate to the body portion, the surface portion including each first end opening and each second end opening of the channels of the plurality of nested channels.

In yet another exemplary embodiment, a method for manufacturing a noise suppression apparatus includes generating a three-dimensional digital model of the noise suppression apparatus. The model includes a body portion including a plurality of nested channels, each channel of the plurality of nested channels including a first end opening and a second end opening, and a surface portion proximate to the body portion, the surface portion including each first end opening and each second end opening of the channels of the plurality of nested channels. The method further includes manufacturing the noise suppression apparatus based on the model using an additive manufacturing technique.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

The presently described embodiments are generally directed to noise suppression, particularly for the suppression of noises generated by operating machinery, such as turbine systems. For purposes of illustration, certain embodiments provided herein will be described in the context of noise suppression apparatus implemented on an aircraft, such as on a gas turbine engine, on an APU, or on an ECS. However, the present disclosure should not be viewed as limited to such aircraft-based implementations. Rather, it will be appreciated that the apparatus and methods described herein will find utility in any system that employs the use of operating machinery, and wherein it is desired to reduce any noises that may be generated by such machinery.

A noise suppression apparatus in accordance with the present disclosure includes multiple passages to provide passive destructive interference. The passages apply an out-of-phase sound field to incoming sound waves, destructively cancelling the energy, creating a reduction in overall sound level. Additive manufacturing techniques may be used to manufacture the complex pattern of passages that would not be feasible or practical using current manufacturing techniques.

Figure 1:
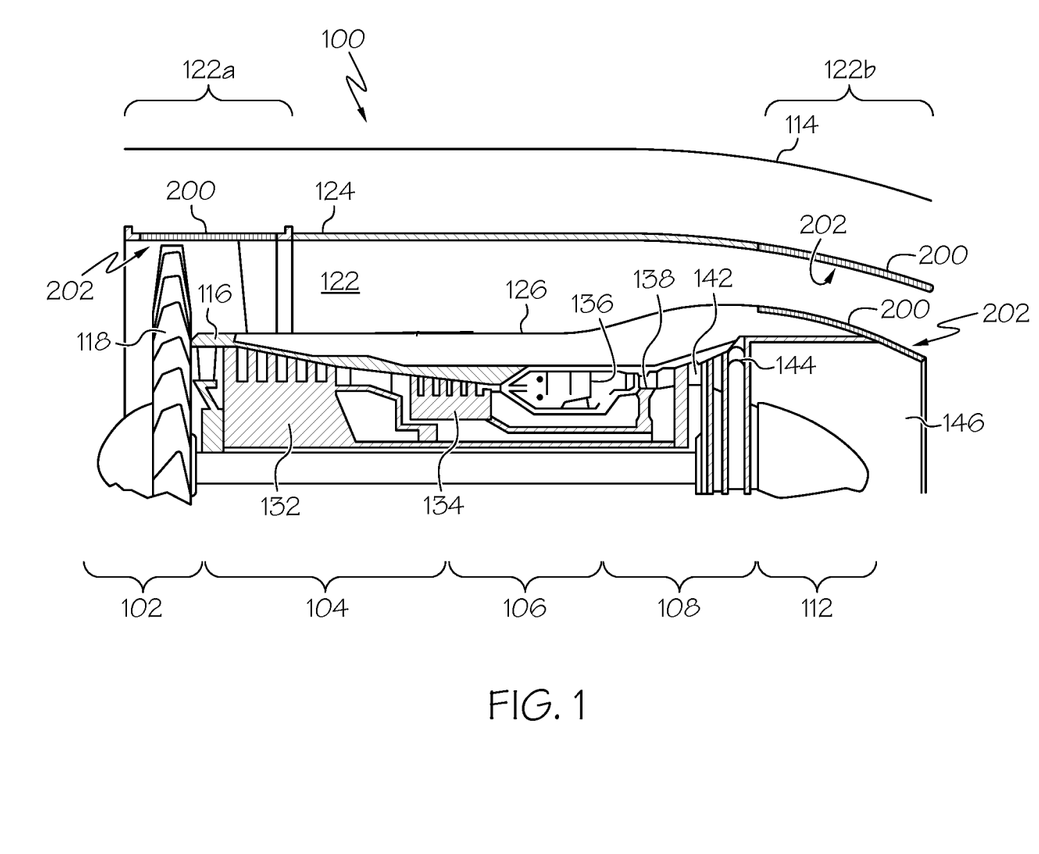
FIG. 1 is a cross-sectional view through an exemplary gas turbine engine implementing a noise suppression apparatus in accordance with some embodiments of the present disclosure.

Turning now to FIG. 1, the implementation of an exemplary noise suppression apparatus is provided in the context of a gas turbine engine 100 for purposes of non-limiting illustration. The gas turbine engine 100 generally includes an intake section 102, a compressor section 104, a combustion section 106, a turbine section 108, and an exhaust section 112. The intake section 102, compressor section 104, combustion section 106, turbine section 108, and exhaust section 112 are all mounted within a nacelle 114. The compressor section 104, combustion section 106, and turbine section 108 are all mounted within an engine case 116.

The intake section 102 includes a fan 118, which draws air into the engine 100 and accelerates it. A fraction of the accelerated fan air that is exhausted from the fan 118 is directed through a fan air bypass duct 122 that is defined by an outer fan duct wall 124 that is spaced apart from and surrounds an inner fan duct wall 126. Most of the fan air that flows through the fan air bypass duct 122 is discharged from the bypass duct 122 to generate a forward thrust. The fraction of fan air that does not flow into the fan air bypass duct 122 is directed into the compressor section 104. The fan air that flows through the bypass duct 122 generates noise as a result of fluid (air) flowing relative to a solid object (the fan duct). Accordingly, it may be desirable to implement one or more noise suppression apparatus 200 at the bypass duct 122, in accordance with the present disclosure. Greater detail regarding noise suppression apparatus 200 is provided below in connection with FIG. 3. For example, as shown in FIG. 1, the apparatus 200 may be located at either or both of an inlet portion 122a of duct 122 and aft portion 122b of duct 122. Additionally, the apparatus 200 may be configured as part of either of both of outer wall 124 and inner wall 126. Wherever implemented, the apparatus 200 may be provided in an annular configuration corresponding to the shape of the respective duct wall 124, 126, with an axial length extending along the rotational axis of the turbine engine 100.

With continued reference to FIG. 1, the compressor section 104 can include one or more compressors. The engine 100 depicted in FIG. 1 includes two compressors—an intermediate pressure compressor 132 and a high pressure compressor 134. No matter the number of compressors it includes, the air that is directed into the compressor section 104 is pressurized to a relatively high pressure. The relatively high pressure air that is discharged from the compressor section 104 is directed into the combustion section 106. The combustion section 106 includes a combustor 136 that is coupled to receive both the relatively high pressure air and atomized fuel. The relatively high pressure air and atomized fuel are mixed within the combustor 136 and the mixture is ignited to generate combusted air. The combusted air is then directed into the turbine section 108. The depicted turbine section 108 includes three turbines—a high pressure turbine 138, an intermediate pressure turbine 142, and a low pressure turbine 144—though it should be appreciated that any number of turbines may be included. The combusted air directed into the turbine section 108 expands through each of turbines 138, 142, 144, causing each to rotate. The air is then exhausted through a propulsion nozzle 146 disposed in the exhaust section 112 to provide additional forward thrust. As the turbines 138, 142, 144 rotate, each drives equipment in the gas turbine engine 100 via concentrically disposed shafts or spools as best seen in FIG. 1.

With the inclusion of noise suppression apparatus 200, the noise generated by gas turbine engine 100 may be reduced. That is, during operation, noise generated by fan air flowing through bypass duct 122, such as through either or both of the inlet portion 122a and the aft portion 122b, may be attenuated by the inclusion of the apparatus 200 along either wall 124 or 126 of either portion 122a or 122b.

Figure 2:
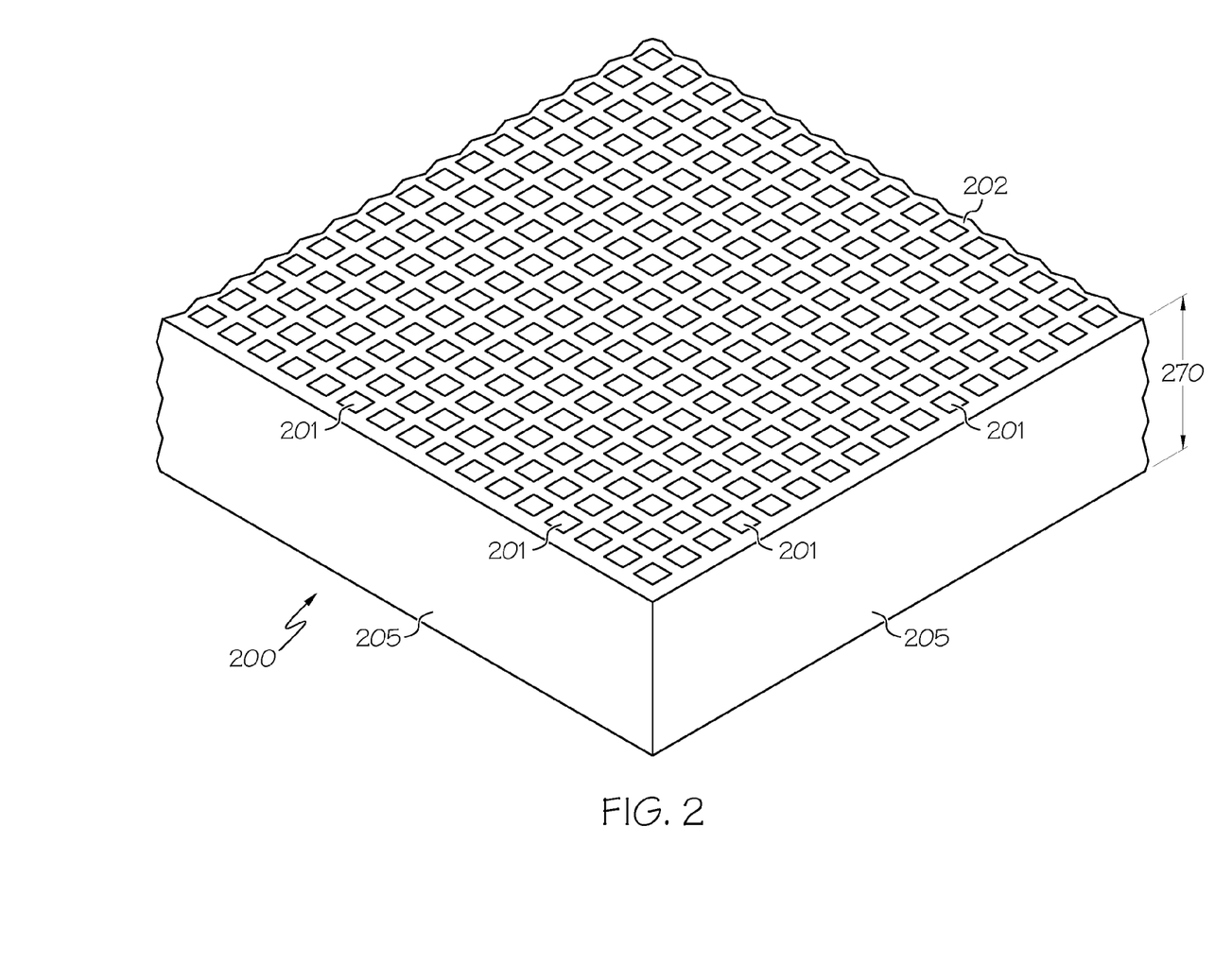
FIG. 2 is a perspective, cutaway view of a noise suppression apparatus according to various embodiments of the present disclosure.
Figure 3A:
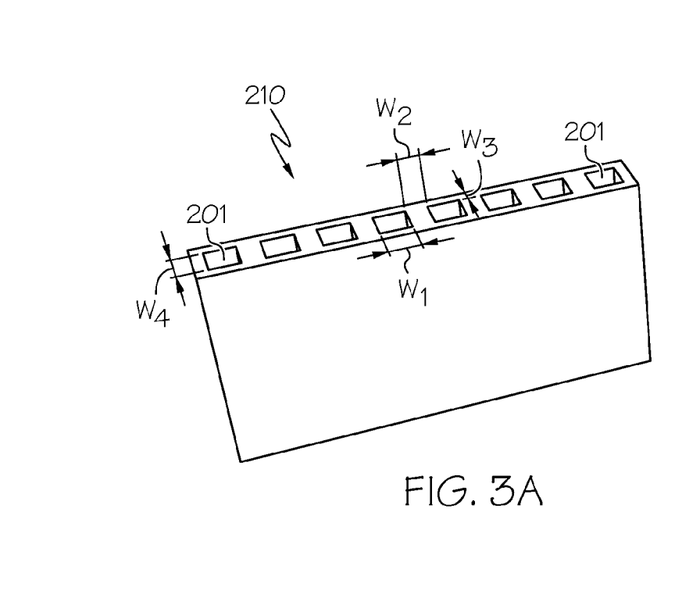
FIGS. 3A, 4A, 5A, and 6A provide side, perspective, top, and cross-sectional views, respectively, of an exemplary eight-block channel pattern of the noise suppression apparatus of FIG. 2.
Figure 3B:
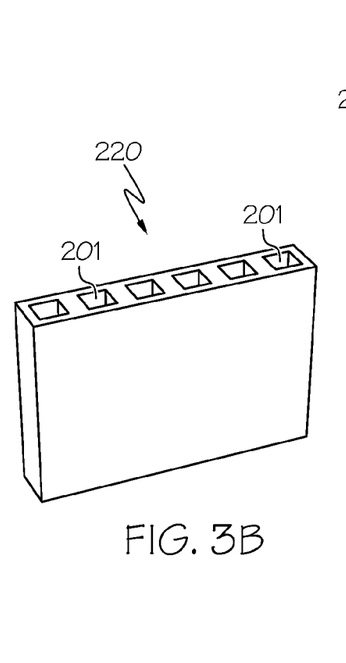
FIGS. 3B, 4B, 5B, and 6B provide side, perspective, top, and cross-sectional views, respectively, of an exemplary six-block channel pattern of the noise suppression apparatus of FIG. 2.
Figures 3C, 3D:
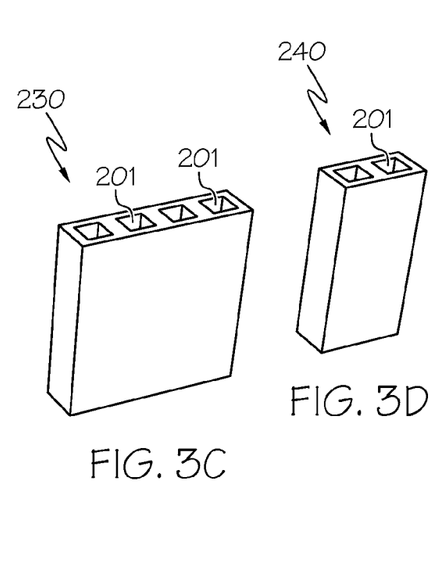
FIGS. 3C, 4C, 5C, and 6C provide side, perspective, top, and cross-sectional views, respectively, of an exemplary four-block channel pattern of the noise suppression apparatus of FIG. 2.
FIGS. 3D, 4D, 5D, and 6D provide side, perspective, top, and cross-sectional views, respectively, of an exemplary two-block channel pattern of the noise suppression apparatus of FIG. 2.
Figure 4A:
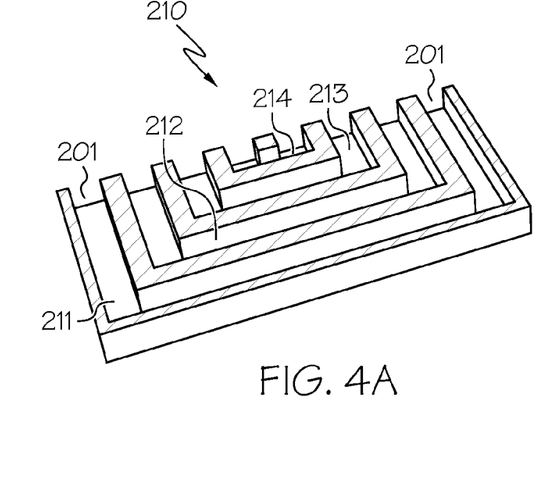
Figures 4B, 4C, 4D:
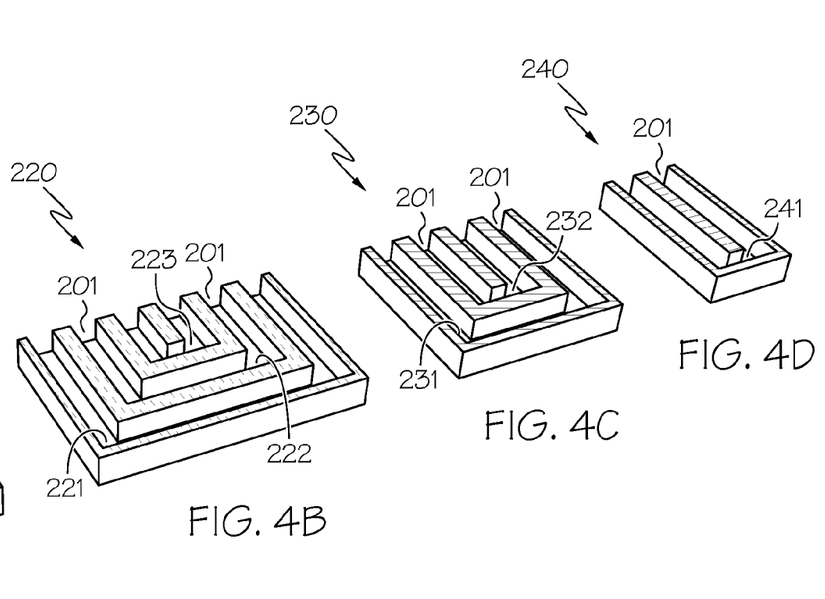
Figure 5A:
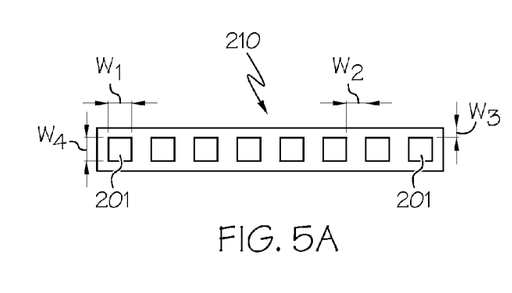
Figure 5B:
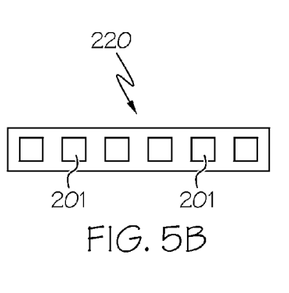
Figure 5C:
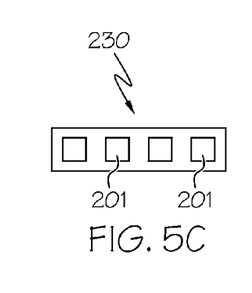
Figure 5D:
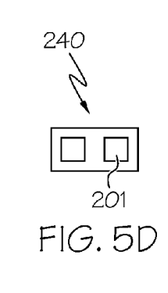

FIG. 2 is a perspective, cutaway view of a noise suppression apparatus 200 according to various exemplary embodiments of the present disclosure. The noise suppression apparatus 200 is adapted to reduce an amount of noise that may travel from one area to another, for example within various flow ducts and passages of equipment, such as turbine engines, APUs, and ECSs, that may be found in an aircraft. According to an embodiment, the noise suppression apparatus 200 may be disposed in an aircraft to reduce noise that may emanate from an engine. For example, the noise suppression apparatus 200 may be placed in an aircraft air duct, such as an air inlet plenum or an engine exhaust duct, as illustrated above in FIG. 1.

To suppress noise, the noise suppression apparatus 200 includes a sound-cancelling body portion 205. The noise suppression apparatus 200 further includes a fluid flow facing surface 202 having a plurality of surface openings 201. The fluid flow facing surface 202 is provided in contact with the flowing fluid, such as the air flowing through the duct 122 in FIG. 1. The surface openings 201 are configured to receive noise energy from a noise source, such as the engine, and to allow at least a portion of the noise to pass into the openings 201. The noise suppression apparatus has a thickness 270 (which in the case of implementation in the duct 122 of a gas turbine engine 100 is a radial thickness) that may be from about 0.5 inches to about 2.0 inches in various embodiments, although greater or lesser values may be used to adapt the apparatus 200 to a particular implementation.

In an embodiment, to provide acoustic transparency, the fluid flow facing surface 202 has openings 201 in an amount and in a configuration sufficient to obtain a desired percent open area value. As is used herein, the phrase "percent open area" (POA) may be defined as an amount of open area of the openings 201 as a percentage of the total surface area of fluid flow facing surface 202 for allowing the passage of sound. In accordance with an embodiment, the fluid flow facing surface 202 has openings to achieve a POA of greater than about 70%. For example, the POA may be in a range of from about 30% to about 80%, although the POA may be more or less.

Each opening 201 of the noise suppression apparatus 200 leads to a channel that extends into the sound cancelling body portion 205. Each channel is associated with two openings 201, one on each end thereof. The channels may be provided in various nested block configurations, as is described in greater detail with regard to FIGS. 3A through 6D. In particular, Figures of the present disclosure ending with letter "A" illustrate eight-block nested channel configurations, those ending with letter "B" illustrate six-block nested channel configurations, those ending with letter "C" illustrate four-block nested channel configurations, and those ending with letter "D" illustrate two-block channel configurations. While the Figures include an eight-block nested channel configuration as the greatest number of blocks illustrated, it will be appreciated that configurations with more than eight blocks are possible. Further, FIGS. 3A-3D provide side views of the respective configurations, FIGS. 4A-4D provide perspective view of the respective configurations, FIGS. 5A-5D provide top views of the respective configurations (i.e., towards surface 202), and FIGS. 5A-5D provide cross-sectional view of the respective configurations.

Figure 6A:
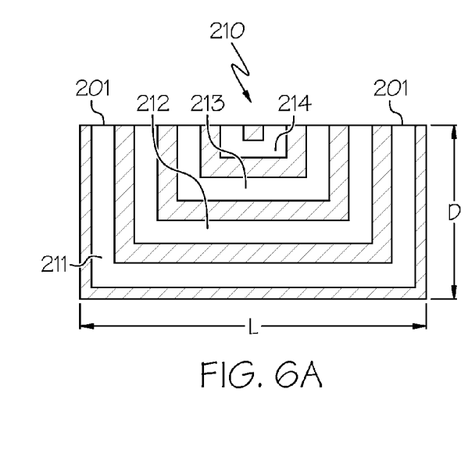
Figure 6B:
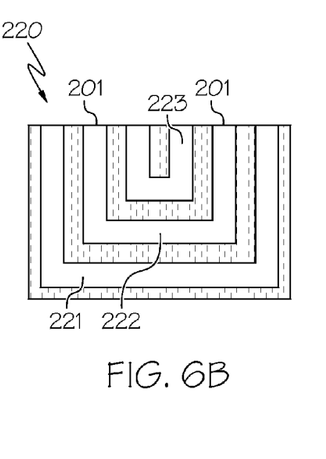
Figure 6C:
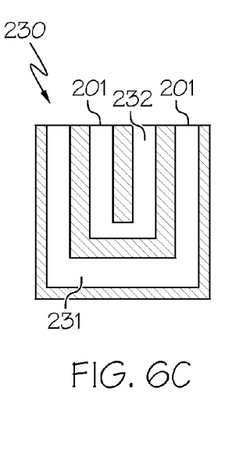
Figure 6D:
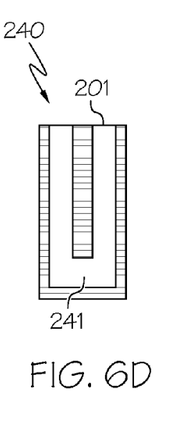

Turning first to FIGS. 3A, 4A, 5A, and 6A, an exemplary eight-block nested channel configuration (210) is provided. The eight-block nested channel configuration includes eight openings 201 that lead to four nested channels 211, 212, 213, and 214. Channel 212 is nested within channel 211, channel 213 is nested within channel 212, and channel 214 is nested within channel 213. As used herein, the term "nested" refers to the fact that the nested channel is provided wholly within the bounds defined by the underlying channel, such channels being provided in abutting adjacency to one another. Each channel 211-212 includes inwardly-extending segments (with respect to surface 202) and one laterally extending segment (also with respect to surface 202) connecting the two inwardly-extending segments. The inwardly-extending segments have a depth "D", which is illustrated in FIG. 6A, and the laterally extending segment has a length "L", also illustrated in FIG. 6A. Each successive nested channel 211, 212, 213, and 214 has a depth D and a length L that is less than the previous channel, such that each channel is able to fit in a nested configuration within the previous channel. For example, channel 212 has a length L and a depth D that is less than the length L and the depth D of channel 211, and so forth.

Turning next to FIGS. 3B, 4B, 5B, and 6B, an exemplary six-block nested channel configuration (220) is provided. The six-block nested channel configuration includes six openings 201 that lead to three nested channels 221, 222, and 223. Channel 222 is nested within channel 221, and channel 223 is nested within channel 212. Each successive nested channel 221, 222, and 223 has a depth D and a length L that is less than the previous channel, such that each channel is able to fit in a nested configuration within the previous channel. For example, channel 222 has a length L and a depth D that is less than the length L and the depth D of channel 221, and so forth.

Turning next to FIGS. 3C, 4C, 5C, and 6C, an exemplary four-block nested channel configuration (230) is provided. The four-block nested channel configuration includes four openings 201 that lead to two nested channels 231 and 232. Channel 232 is nested within channel 231. Each successive nested channel 231, 232 has a depth D and a length L that is less than the previous channel, such that each channel is able to fit in a nested configuration within the previous channel. For example, channel 232 has a length L and a depth D that is less than the length L and the depth D of channel 231.

Turning next to FIGS. 3D, 4D, 5D, and 6D, an exemplary two-block channel configuration (240) is provided. The two-block channel configuration includes two openings 201 that lead to one channel 241.

The outermost (i.e., lowest nested channel) of each of the eight-, six-, four-, and two-block nested channel configurations have substantially equivalent depths D. However, because the greater-block configurations have more blocks to traverse laterally, the length L of the outermost channel of the eight-block configuration will be greater than that of the six-, four-, and two-block configurations, and so forth. This depth/length relationship remains true for each successive inwardly nested channel as well (e.g., channels 212, 222, and 232 have the same depths D, but successively shorter lengths L, and so forth). The magnitude of the greatest depth D (i.e., the depth D for channels 211, 221, 231, and 241) will vary greatly from embodiment to embodiment, but is generally slightly less than the magnitude of thickness 270 (to account for the thickness of the exterior walls of the apparatus 200). The magnitude of the greatest length L (i.e., that of channel 211) will again vary greatly from embodiment to embodiment, but may generally be about 1.5 to about 5 times the magnitude of the greatest depth D. The lengths/depths of other channels will thus be smaller in magnitude, according to the dimensions of the channels and the spacing between channels, as discussed below.

With greater attention now to the configuration of the openings 201 leading to the channels present in each of FIGS. 3A through 6D, in some embodiments, such as those depicted, the openings 201 may be generally rectangular, having dimensions $W_1$ and $W_4$ as illustrated. In particular embodiments, the openings may be square, where $W_1$ and $W_4$ may be substantially equal. Generally, the magnitude of $W_1$ and $W_4$ may be from about 0.05 inches to about 0.2 inches, although greater or smaller magnitudes are possible in alternative configurations. The corresponding dimensions of the channels may be maintained consistently with the openings 201. The spacing between channels $W_2$ may be from about 0.02 inches to about 0.15 inches. Additionally, the thickness of the sidewalls of the noise suppression apparatus 200 surrounding the channels ($W_3$) may be from about 0.01 inches to about 0.1 inches. Although, with regard to these dimensions, greater or smaller magnitudes are possible in alternative embodiments.

As initially noted above, the noise suppression apparatus 200 in accordance with the present disclosure includes multiple passages to provide passive destructive interference. The passages apply an out-of-phase sound field to incoming sound waves, destructively cancelling the energy, creating a reduction in overall sound level. Additive manufacturing techniques may be used to manufacture the complex pattern of passages that is not feasible using current manufacturing techniques. As will be appreciated by those having ordinary skill in the art, the term destructive interference means that two interfering sound waves that are in counter-phase cancel each other, and the term passive means that no active components (such as speakers) are used. Through an air-path with a certain length, sound waves from a common source are entering from both sides. At a given point, the sound waves meet with a 180° phase difference (half of a wavelength) and therefore cancel each other by destructive interference. This method uses the sound itself to drastically reduce noise and does not require a secondary sound source such as a speaker, and hence it can overcome many problems of active noise control methods like energy use of equipment, needed fast processors to match the acoustic signal, difficulties with coping with varying sounds, and difficulties with noise control in big or unconfined spaces. Moreover, the exploitation of the geometry-related capabilities of such configurations provides improved performance and increased freedom in design and material choice.

For example, according to the foregoing multi-block channel configurations, each channel thereof has a different length that would be suitable for attenuating noise at a different frequency or set of frequencies. The analysis of a noise source will reveal the frequencies and level of noise generated at each frequency. Based on this information, an apparatus 200 can be designed that includes various numbers of eight-, six-, four-, and two-block channel configurations (as well as others if greater numbered block configurations are available) that "tailor" the apparatus 200 to attenuate the exact noise that is being generated. More specifically, an apparatus 200 can include various numbers of each of the different block configurations to "tune" the apparatus for noise suppression of a specifically-identified noise source.

Figure 7:
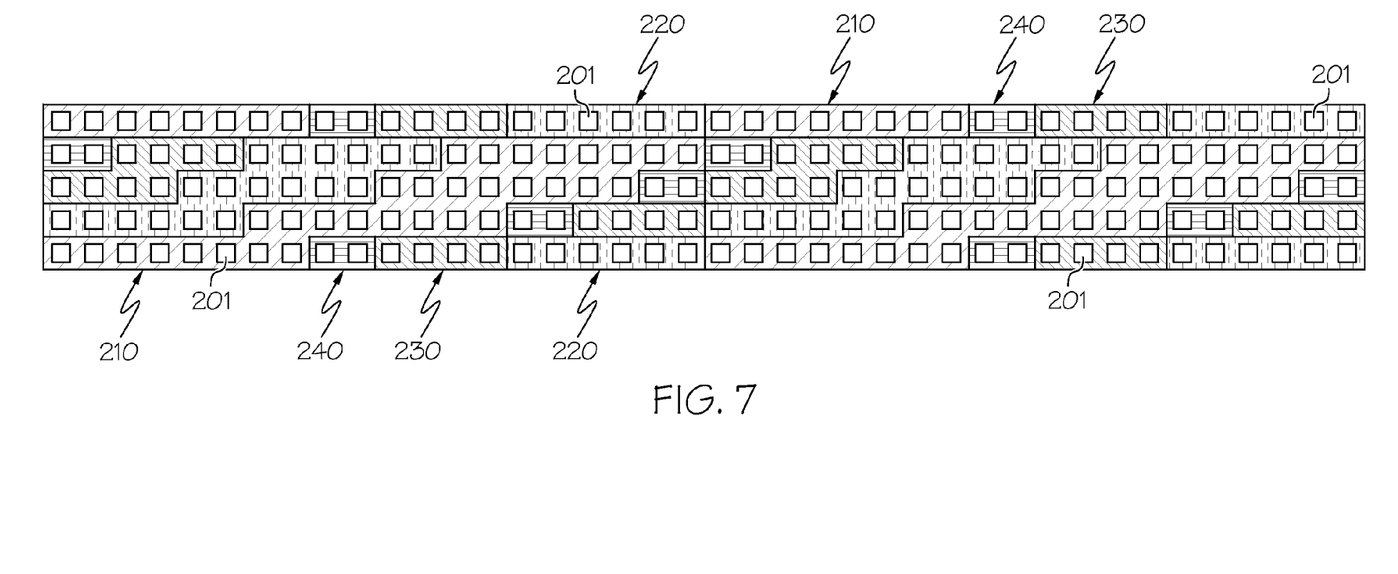
FIG. 7 provides an exemplary block pattern layout of various two-block, four-block, six-block, and eight-block patterns that may be implemented in the noise suppression apparatus of FIG. 2.

FIG. 7 provides an example of this "tailoring" or "tuning" As shown therein, a portion of an upper surface 202 of an exemplary apparatus 200 is illustrated. The apparatus 200 include various numbers of each of the previously-described eight-block (210), six-block (220), four-block (230), and two-block (240) nested channel structures, in various layout configurations. Thus, the apparatus 200 shown in FIG. 7 is tailored for a particular use, that is, it is tailored for the reduction of a particular noise, which can be cancelled using destructive interference by the noise passing through the various channels of the apparatus 200.

Figure 8:
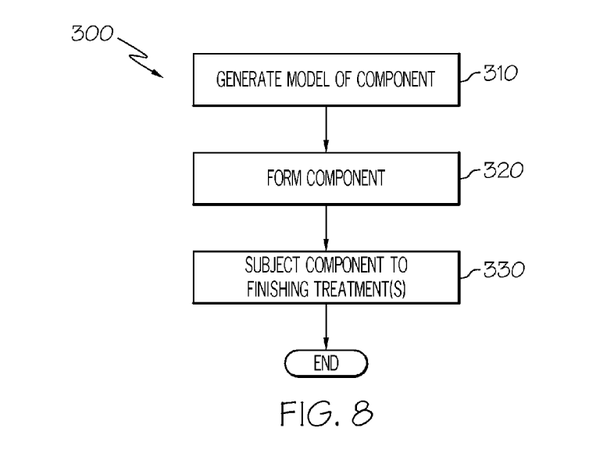
FIG. 8 is a flow diagram illustrating steps in a method of manufacturing a portion of a noise suppression apparatus, such as that shown in FIG. 2, using additive manufacturing techniques.

As initially noted above, additive manufacturing techniques may be used to manufacture the complex pattern of passages that is not feasible using current manufacturing techniques. FIG. 8 is a flowchart illustrating a method 300 for manufacturing a component, for example a noise suppression apparatus 200 as described above with regard to FIG. 2, using, in whole or in part, powder bed additive manufacturing techniques based on low energy density energy beams. In a first step 310, a model, such as a design model, of the apparatus 200 may be defined in any suitable manner. For example, the model may be designed with computer aided design (CAD) software and may include three-dimensional ("3D") numeric coordinates of the entire configuration of the apparatus including both external and internal surfaces (i.e., surface 202, noise cancelling body portion 205). In one exemplary embodiment, the model may include a number of successive two-dimensional ("2D") cross-sectional slices that together form the 3D component.

In step 320 of the method 300, the apparatus is formed according to the model of step 310. In one exemplary embodiment, a portion of the apparatus is formed using a rapid prototyping or additive layer manufacturing process. In other embodiments, the entire apparatus is formed using a rapid prototyping or additive layer manufacturing process.

Some examples of additive layer manufacturing processes include: selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; and selective laser melting. In general, powder bed additive manufacturing techniques provide flexibility in free-form fabrication without geometric constraints, fast material processing time, and innovative joining techniques. In one particular exemplary embodiment, SLM is used to produce the component in step 320. SLM is a commercially available laser-based rapid prototyping and tooling process by which complex parts may be directly produced by precision melting and solidification of metal powder into successive layers of larger structures, each layer corresponding to a cross-sectional layer of the 3D component.

As such, in one exemplary embodiment, step 320 is performed with SLM techniques to form the apparatus 200. However, prior to a discussion of the subsequent method steps, reference is made to FIG. 9, which is a schematic view of a SLM system 400 for manufacturing the apparatus.

Figure 9:
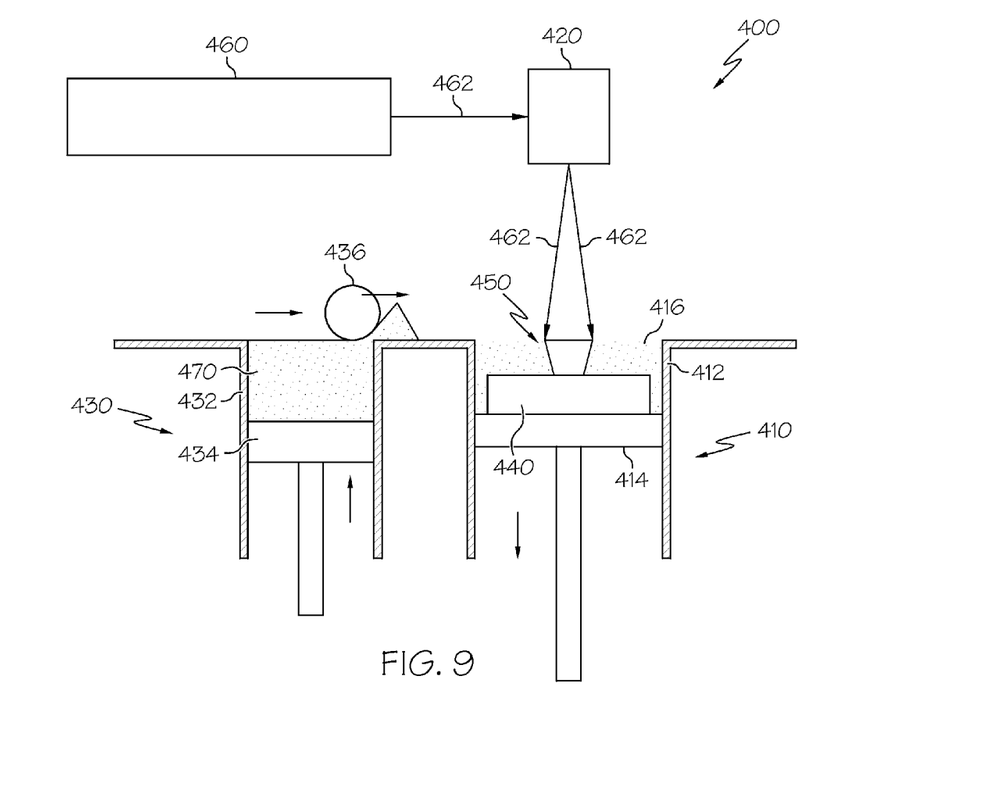
FIG. 9 is an exemplary additive manufacturing system suitable for use in manufacturing the portion of the noise suppression apparatus, such as that shown in FIG. 2, using additive manufacturing techniques.

Referring to FIG. 9, the system 400 includes a fabrication device 410, a powder delivery device 430, a scanner 420, and a low energy density energy beam generator, such as a laser 460 (or an electron beam generator in other embodiments) that function to manufacture the article 450 (e.g., the apparatus 200) with build material 470. The fabrication device 410 includes a build container 412 with a fabrication support 414 on which the article 450 is formed and supported. The fabrication support 414 is movable within the build container 412 in a vertical direction and is adjusted in such a way to define a working plane 416. The delivery device 430 includes a powder chamber 432 with a delivery support 434 that supports the build material 470 and is also movable in the vertical direction. The delivery device 430 further includes a roller or wiper 436 that transfers build material 470 from the delivery device 430 to the fabrication device 410.

During operation, a base block 440 may be installed on the fabrication support 414. The fabrication support 414 is lowered and the delivery support 434 is raised. The roller or wiper 436 scrapes or otherwise pushes a portion of the build material 470 from the delivery device 430 to form the working plane 416 in the fabrication device 410. The laser 460 emits a laser beam 462, which is directed by the scanner 420 onto the build material 470 in the working plane 416 to selectively fuse the build material 470 into a cross-sectional layer of the article 450 according to the design. More specifically, the speed, position, and other operating parameters of the laser beam 462 are controlled to selectively fuse the powder of the build material 470 into larger structures by rapidly melting the powder particles that may melt or diffuse into the solid structure below, and subsequently, cool and re-solidify. As such, based on the control of the laser beam 462, each layer of build material 470 may include unfused and fused build material 470 that respectively corresponds to the cross-sectional passages and walls that form the article 450. In general, the laser beam 462 is relatively low power to selectively fuse the individual layer of build material 470. As an example, the laser beam 462 may have a power of approximately 50 to 500 Watts, although any suitable power may be provided.

Upon completion of a respective layer, the fabrication support 414 is lowered and the delivery support 434 is raised. Typically, the fabrication support 414, and thus the article 450, does not move in a horizontal plane during this step. The roller or wiper 436 again pushes a portion of the build material 470 from the delivery device 430 to form an additional layer of build material 470 on the working plane 416 of the fabrication device 410. The laser beam 462 is movably supported relative to the article 450 and is again controlled to selectively form another cross-sectional layer. As such, the article 450 is positioned in a bed of build material 470 as the successive layers are formed such that the unfused and fused material supports subsequent layers. This process is continued according to the modeled design as successive cross-sectional layers are formed into the completed desired portion, e.g., the apparatus of step 320.

The delivery of build material 470 and movement of the article 450 in the vertical direction are relatively constant and only the movement of the laser beam 462 is selectively controlled to provide a simpler and more precise implementation. The localized fusing of the build material 470 enables more precise placement of fused material to reduce or eliminate the occurrence of over-deposition of material and excessive energy or heat, which may otherwise result in cracking or distortion. The unused and unfused build material 470 may be reused, thereby further reducing scrap.

Any suitable laser and laser parameters may be used, including considerations with respect to power, laser beam spot size, and scanning velocity. The build material 470 may be any metallic or nonmetallic material suitable for additive manufacturing, as is known in the art. In general, the powder build material 470 may be selected for enhanced strength, durability, and useful life, particularly at high temperatures, although as described below, the powder build material 470 may also be selected based on the intended function of the area being formed.

Returning to FIG. 8, at the completion of step 320, the article 450, i.e., the apparatus 200, may be given a stress relief treatment and then is removed from the powder bed additive manufacturing system (e.g., from the SLM system 400). In optional step 330, the component formed in step 320 may undergo finishing treatments. Finishing treatments may include, for example, polishing and/or the application of coatings. If necessary, the apparatus may be machined to final specifications.

Accordingly, the exemplary embodiments described herein provide noise suppression apparatus that includes multiple passages to provide passive destructive interference. The passages apply an out-of-phase sound field to incoming sound waves, destructively cancelling the energy, creating a reduction in overall sound level. Additive manufacturing techniques may be used to manufacture the complex pattern of passages that is not feasible using current manufacturing techniques.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A turbine system comprising:
   a rotating component;
   an annular wall component annularly surrounding the rotating component; and
   an annular noise suppression apparatus disposed within or along the annular wall component, the noise suppression apparatus being manufactured using an additive manufacturing technique, wherein the noise suppression apparatus comprises an annular body portion that has a radial thickness defined with respect to a longitudinally oriented central axis of the turbine system and a longitudinal length also defined with respect to the central axis, and comprising a plurality of channels, each channel of the plurality of channels comprising:
   a first end opening and a second end opening, each second end opening being longitudinally spaced from its associated first end opening with respect to the central axis, and
   two outwardly extending segments that extend radially into the body portion from the inner annular surface, wherein each of the two outwardly extending segments connects with a first end opening or a second end opening, and
   a longitudinally extending segment with respect to the central axis that extends within the body portion between the two outwardly extending segments;
   wherein the first and second end openings are positioned along an inner annular surface of the annular body portion so as to form an m by n array of openings along the inner annular surface, the array being defined by m openings oriented circumferentially at a constant longitude with respect to the central axis and n openings oriented longitudinally with respect to the central axis, the total number of first and second openings being m×n;
   wherein, of the plurality of the channels, a first channel thereof has first radially outwardly extending segments that extend a first radially outward distance and a first longitudinally extending segment that extends a first longitudinal distance, and wherein, of the plurality of the channels, a second channel thereof has second outwardly extending segments that extend a second radially outward distance, greater than the first radially outward distance, and a second longitudinally extending segment that extends a second longitudinal distance, greater than the first longitudinal distance, and
   wherein the first longitudinally extending segment and the second longitudinally extending segment overlap one another in the radial direction, and wherein the inner annular surface exhibits a percentage open area ("POA"), defined as a percentage of an area of the inner annular surface occupied by both the first and second end openings, of greater than 70%.

2. The turbine system of claim 1, wherein the turbine system is selected from the group consisting of: a jet engines, an auxiliary power unit, and an environmental control system.

3. The turbine system of claim 2, wherein the turbine system comprises a jet engine, wherein the rotating component comprises a turbine shaft, and wherein the wall component comprises a bypass duct wall.

* * * * *

UNITED STATES PATENT AND TRADEMARK OFFICE
CERTIFICATE OF CORRECTION

PATENT NO. : 9,624,791 B2  
APPLICATION NO. : 14/483730  
DATED : April 18, 2017  
INVENTOR(S) : Weir Page 1 of 1

It is certified that error appears in the above-identified patent and that said Letters Patent is hereby corrected as shown below:

In the Claims

Column 10, Line 60, "engines," should be changed to --engine,--

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*